United States Patent
Clausse et al.

(10) Patent No.: US 8,016,580 B2
(45) Date of Patent: Sep. 13, 2011

(54) ASSEMBLY AND A METHOD FOR EXTRUDING A TIRE COMPONENT

(75) Inventors: Damien Ghislain Clausse, Fauvillers (BE); Marc Jean Kerger, Arlon (BE); Kim Clement Nicolas Pirrotte, Tuntange (LU); Philippe Nicolas Joseph Renard, Wiltz (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 324 days.

(21) Appl. No.: 12/360,998

(22) Filed: Jan. 28, 2009

(65) Prior Publication Data
US 2010/0186875 A1    Jul. 29, 2010

(51) Int. Cl.
*B29C 47/30* (2006.01)
*B29C 47/06* (2006.01)

(52) U.S. Cl. .................. 425/133.1; 425/130; 425/133.5; 264/173.16; 264/173.17; 264/174.11; 156/244.11; 156/501

(58) Field of Classification Search ............... 425/131.1, 425/133.1, 133.5, 130; 156/244.12; 264/173.12, 264/174.11
See application file for complete search history.

(56) References Cited

U.S. PATENT DOCUMENTS

| | | | | |
|---|---|---|---|---|
| 3,280,427 A * | 10/1966 | Smith | ......................... | 425/131.1 |
| 4,556,376 A * | 12/1985 | Sievers et al. | ............... | 425/133.5 |
| 4,653,994 A * | 3/1987 | Capelle | ...................... | 425/131.1 |
| 5,705,111 A * | 1/1998 | Blemberg et al. | ........ | 264/173.13 |
| 2001/0022410 A1 * | 9/2001 | Benatti | .................... | 264/173.17 |

* cited by examiner

*Primary Examiner* — Philip Tucker
*Assistant Examiner* — William Bell
(74) *Attorney, Agent, or Firm* — David L King

(57) ABSTRACT

In order to facilitate the assembly of a tire component like an Off the Road tire shoulder wedge, it is proposed to extrude this component with a high tack compound coating at its periphery by using a dual extruder which otherwise can extrude the tire component with a first high tack compound coating on one side, combined with an assembly for the extruder comprising a splice bar, a holder and a die which are designed to provide a channel deriving and guiding a portion of the high tack compound of the extruder to the stream of compounds before extrusion through the die, on a side opposite to the first coating, thereby providing a coating at almost the whole periphery of the component.

14 Claims, 5 Drawing Sheets

ASSEMBLY AND A METHOD FOR EXTRUDING A TIRE COMPONENT

FIELD OF THE INVENTION

The present invention is directed to an assembly and a method for extruding a tire component, more particularly for extruding a tire shoulder wedge.

BACKGROUND OF THE INVENTION

The use of shoulder wedges in off the road tires is commonly known. They are used for reinforcing the shoulder portions and the sidewalls of a tire. FIG. 1 is a cross-sectional view of a tire and illustrates under the reference sign S a shoulder wedge integrated in the tire. Such wedges like the other tire elements are typically extruded and assembled together.

Some of these tire components require the application of cement based on organic solvents which dissolve the surface of rubber after extrusion. The contact surfaces are refreshed by, for example, wire brushing with the application of organic solvents during the building of the tire.

The application of volatile organic solvents in mass leads to a high level of emission and requires investing in expensive solvent treatment units. Such treatment units will indeed be required in the near future for meeting environmental legislation.

DEFINITIONS

The concepts "upper", "lower", "base", "cap", "top", "bottom", "horizontal" and "vertical" which are used in the following description are used merely for the sake of clarity and are not to be understood in any case as absolute and limiting. The assembly described can be oriented differently while keeping the same relative arrangements and design.

SUMMARY OF THE INVENTION

There is provided an assembly for a tire component extruder, comprising: a splice bar designed for guiding and uniting a first stream of a first rubber compound and a second stream of a second rubber compound; a die to be positioned downstream of the splice bar, the die comprising a shaped opening through which the united streams of the first and second compounds are extruded for forming the tire component; an auxiliary channel in communication with the second stream of the second rubber compound and with a feeding end between the splice bar and the die at the vicinity of the united first and second streams of rubber compounds at the first stream side in order to feed the united streams at a side opposite to the second stream with an auxiliary stream of the second compound before extrusion through the die.

In one aspect of the invention, the channel is in communication with the second stream of the second rubber compound upstream of the splice bar.

In another aspect of the invention, the channel comprises at least a lateral passage provided in the splice bar in communication with the second stream.

In yet another aspect of the invention, the feeding end of the channel comprises a slot.

In yet another aspect of the invention, the assembly further comprises a lip designed to be positioned between the splice bar and the die and inclined towards the die such that the lip guides the united streams at the first stream side towards the die, the slot being arranged downstream of the lip.

In yet another aspect of the invention, the assembly further comprises a holder comprising an opening designed for receiving the splice bar on one side and the die on the other side, and wherein the lip is provided on the holder in the opening.

In yet another aspect of the invention, the downstream side of the lip and the die form a passage of the auxiliary channel.

In yet another aspect of the invention, the die comprises a plate with a shaped opening corresponding to the cross-section of the tire component to be extruded, the edge of the lip being distant from the plate in the area of said shaped opening in order to form the slot for feeding the auxiliary stream of the second rubber compound.

In yet another aspect of the invention, the splice bar comprises at each extremity a positioning block with at least two surfaces coming into contact with the holder when the splice bar is positioned in the holder, wherein at least one of the blocks comprises a recess formed in the at least two surfaces, the recess forming with the holder a curved passage of the auxiliary channel guiding the second rubber compound from the second stream upstream of the splice bar to the passage between the lip and the die.

In yet another aspect of the invention, the curved passage communicates with the passage between the lip and the die at a lateral end of the lip for feeding the passage between the lip and the die with the auxiliary stream of second rubber compound.

In yet another aspect of the invention, the opening of the holder comprises a recess at a lateral end of the lip for communicating the curved passage with the passage between the lip and the die.

In yet another aspect of the invention, the die plate is slightly recessed at an area in the vicinity of the shaped opening on the side of the plate coming into contact with the holder, the recessed area forming the slot between the die and the lip for the auxiliary stream of the second rubber compound.

In yet another aspect of the invention, the die comprises a first plate with a first recessed edge and a second plate with a second edge to be positioned against the first edge, the first recessed edge and the second edge forming the shaped opening of the die.

Finally there is also provided a method for producing a tire component by extrusion of rubber compound through an extruder comprising the steps of extruding a first rubber compound through said extruder for forming the tire component and simultaneously extruding a second rubber compound through said extruder for forming a coating at the periphery of the cross sectional area of the tire component during extrusion thereof.

In one aspect of the invention, the second compound is a high tack compound.

In another aspect of the invention, the tire component is a shoulder wedge.

In yet another aspect of the invention, the second rubber compound is a high tack compound and the coating forms a smear on the outer surface of the tire component for facilitating the assembly of the tire component with other elements of the tire.

In yet another aspect of the invention, the extruding step comprises: guiding and uniting a first stream of the first rubber compound with a second stream of the second rubber compound and simultaneously guiding an auxiliary stream of the second rubber compound to the united first and second streams at the first stream side opposite to the second stream in order to join the auxiliary stream to the united first and second streams; extruding the united first, second and auxiliary streams of compound through an extrusion die for forming the tire component; such that at least two opposite sides of the tire component are coated with the second compound.

In yet another aspect of the invention, the auxiliary stream of the second compound is guided to the first stream through a slot arranged before the die.

In yet another aspect of the invention, said extruder is a duplex extruder.

BRIEF DESCRIPTION OF THE DRAWINGS

The invention will be described by way of example and with reference to the accompanying drawings in which.

DETAILED DESCRIPTION OF THE INVENTION

Figure 1:
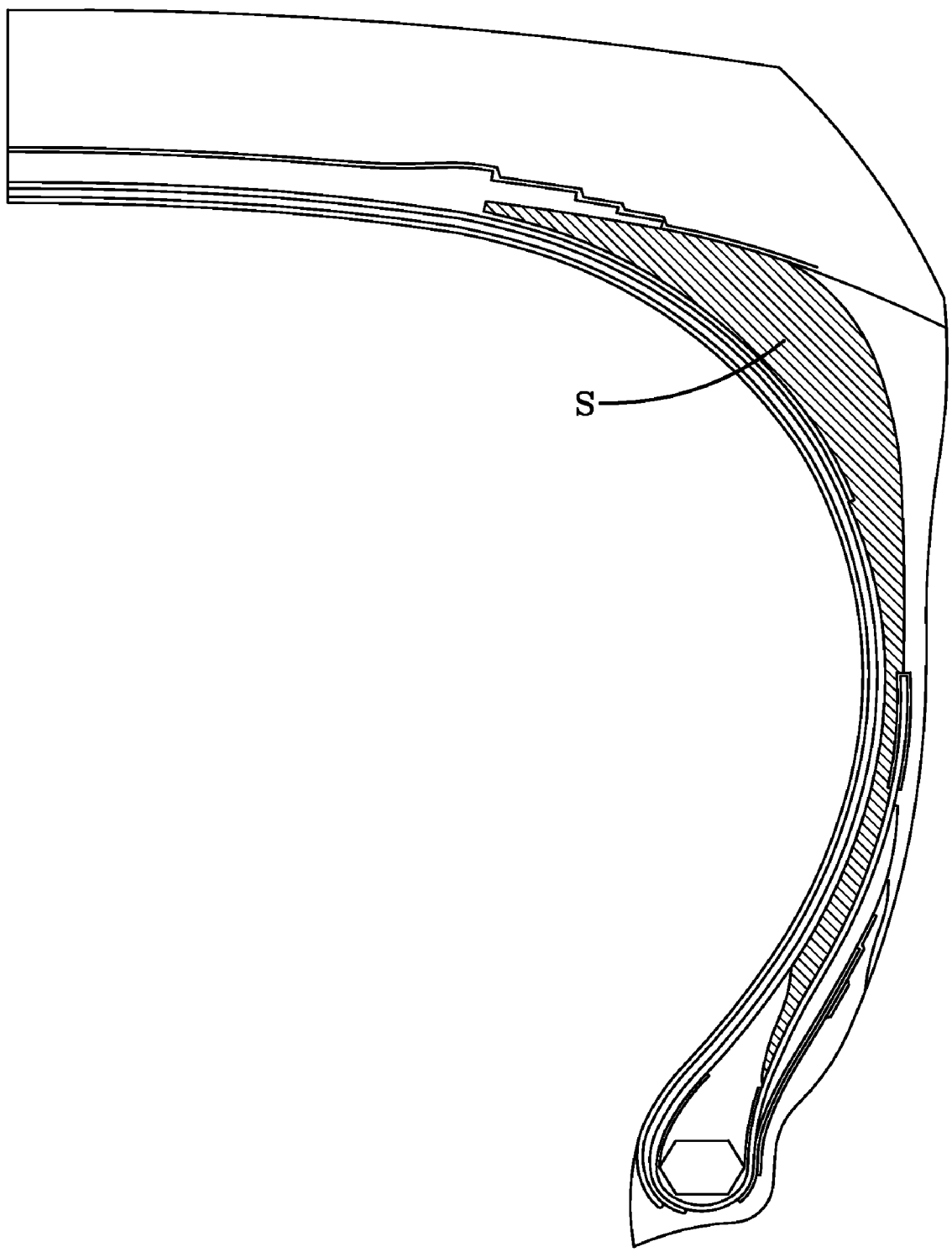
FIG. 1 is a sectional view of a standard tire illustrating a shoulder wedge (indicated by the arrow and the reference sign S).

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification.

Figure 2:
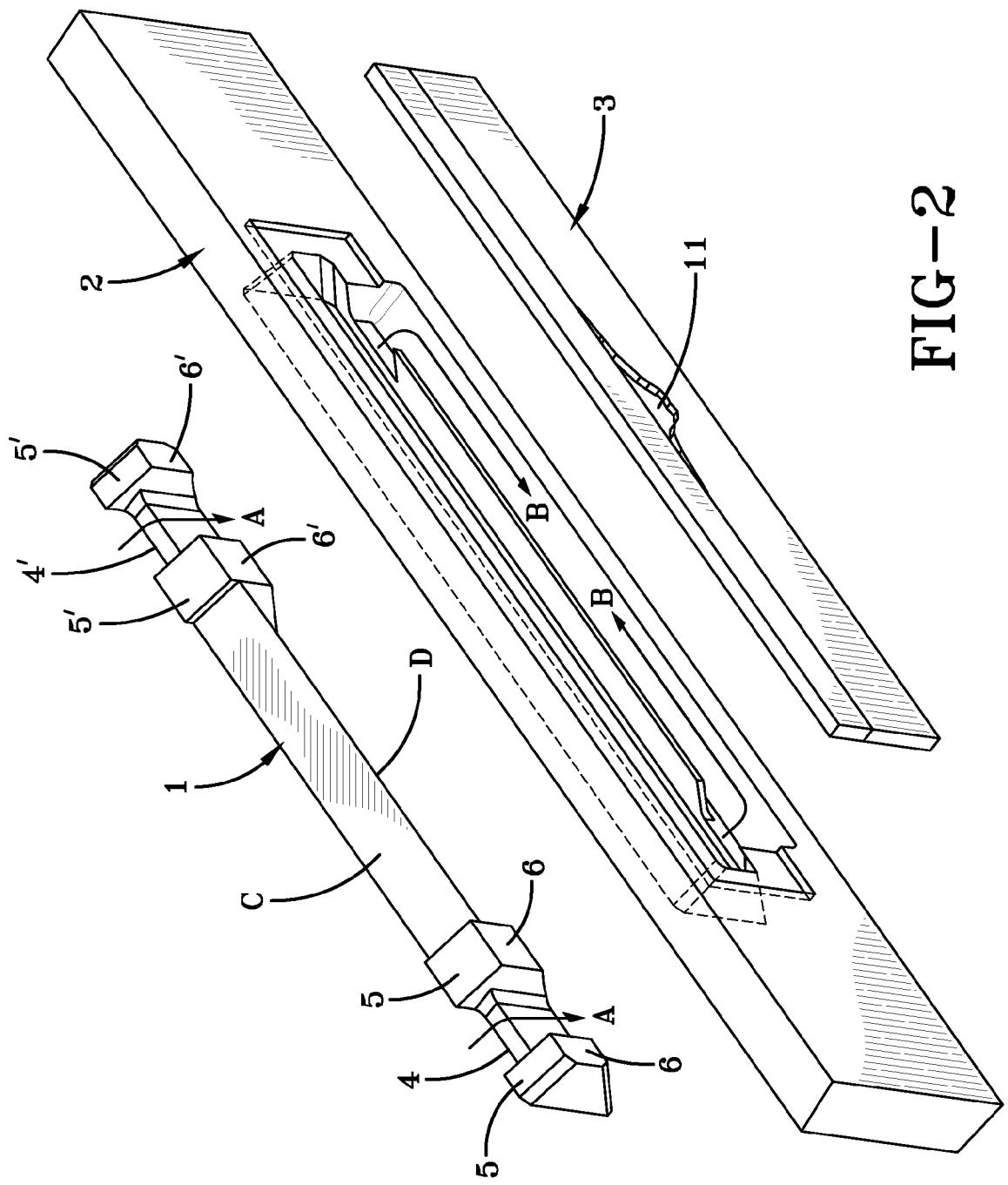
FIG. 2 is an exploded view in perspective of the assembly for extruding a tire component in accordance with the invention.
Figure 3:
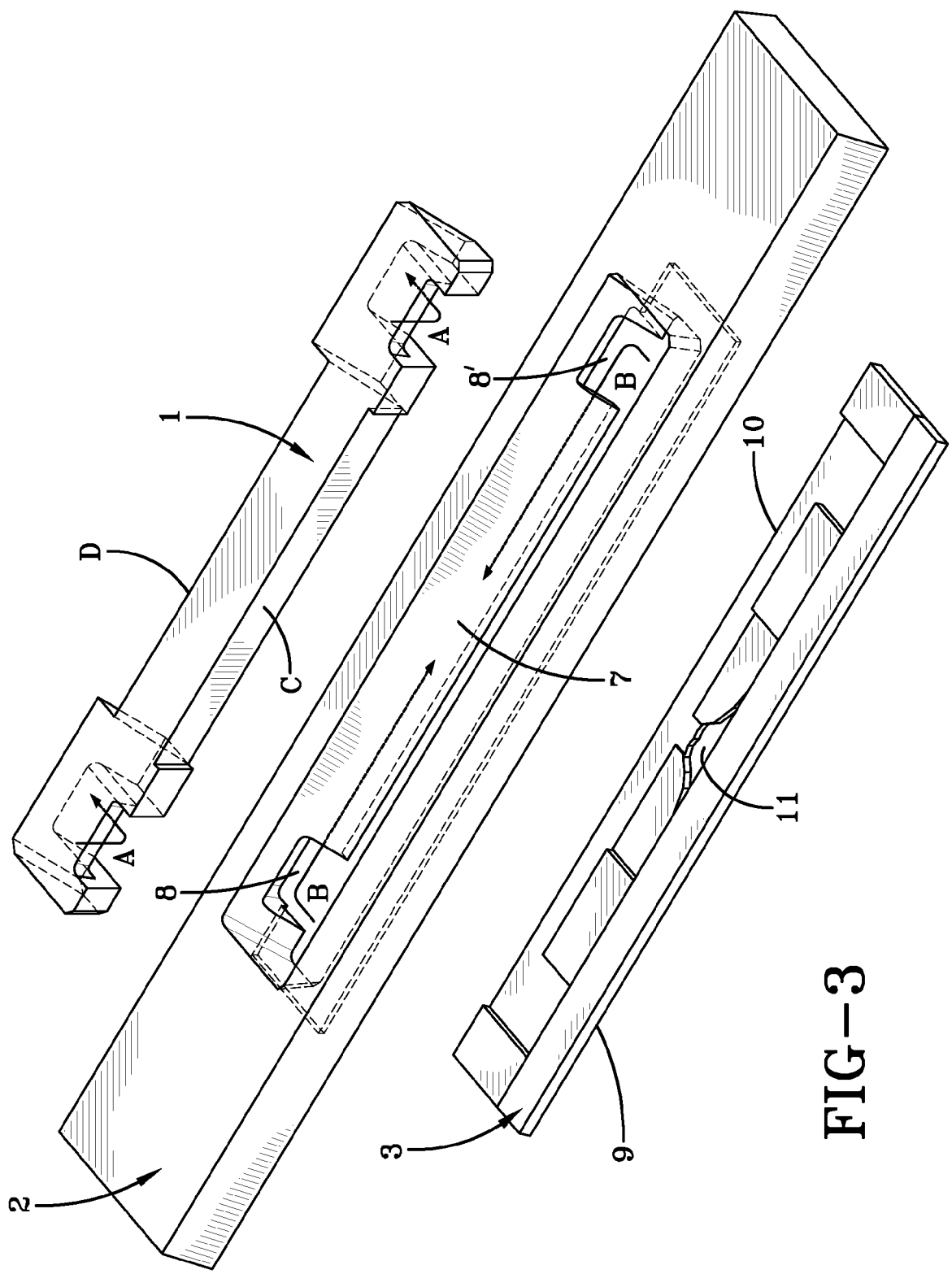
FIG. 3 is another exploded view in perspective of the assembly of FIG. 1 from another point of view.

The concepts "cap", "base", "top" and "bottom" used in this description relate to the shape of the shoulder wedge to be extruded where the flat portion of the shoulder wedge corresponds to the bottom or base portion thereof and the wedge portion corresponds to the cap or top portion. For the sake of clarity the exploded view in FIG. 2 shows an extruder assembly in an orientation where the bottom flat portion of the shoulder wedge is directed upwardly. The concepts "cap" and "base" relate therefore to lower elements in FIG. 2 and "top" and "bottom" correspond to upper elements. The extruder assembly as illustrated in FIGS. 2 and 3 comprises a splice bar 1, a holder 2 and a die 3. The splice bar 1 is designed to guide and unite two separate streams of rubber. The splice bar is an elongated element with a fastening and positioning block 4, 4' at each end. The cross section of these blocks is trapezoid. Each block 4, 4' comprises a bottom surface 5, 5', a front surface 6, 6', a top surface and a rear surface. The cross section of the guiding section of the bar is triangular. The base surface C is designed to guide a first stream of rubber whereas the cap surface D is designed to guide a second stream of rubber. The rear surface of the guiding section is in the same plane as the rear surface of the blocks 4 and 4'. This surface is designed to come in contact with a corresponding surface of an extruder able to produce two distinct streams of rubber. The cap and base surfaces of the guiding section of the splice bar intersect downstream in order to bring together and unite the two separate streams of rubber.

The holder 2 is shaped as a rectangular plate comprising an opening. This opening is shaped for receiving the splice bar 1. The bottom surfaces 5, 5' and top surfaces of the blocks 4, 4' come in thrust engagement with corresponding surfaces of the opening.

The die element 3 is generally shaped as a plate comprising a shaped opening 11 through which the tire component is extruded. The holder 2 and the die element 3 are designed to come into engagement when assembled. To that end the holder 2 comprises a recess corresponding to the outer surface of the die so that the die can be very precisely positioned relative to the holder and the splice bar. When the three elements, i.e. the splice bar, the holder and the die element, are assembled together, the front surfaces 6 and 6' of the splice bar 1 are in contact with the rear surface of the die.

Figure 5:
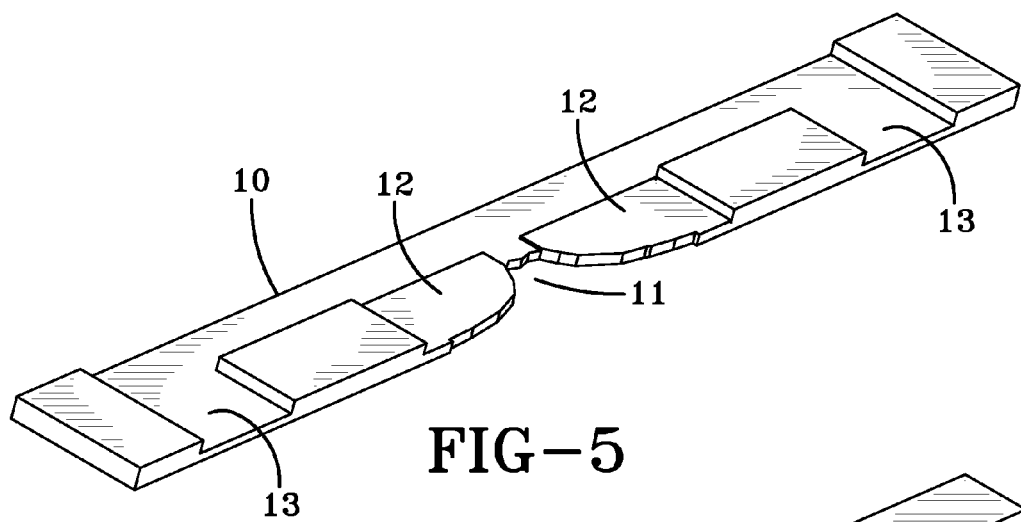
FIGS. 5 and 6 are perspective views of the die components of the assembly illustrated in FIGS. 1, 2 and 3.
Figure 6:
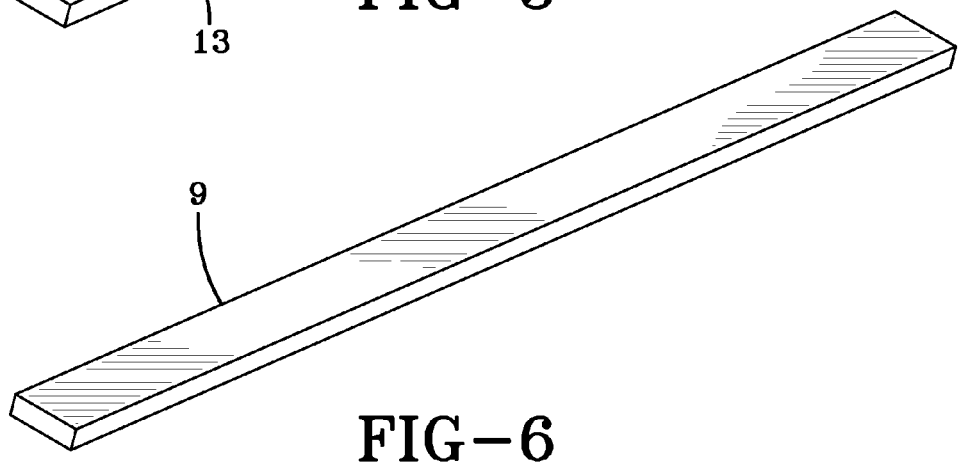

The die element 3 is made of two parts, namely the die 10 and the back die 9. This construction is better illustrated in FIGS. 5 and 6. The die 10 is designed as a rectangular plate with a recess 11 at one of its longer edges. This recess 11 provides the cross sectional shape of the tire element to be extruded. The die 10 comprises also a series of undercut sections as illustrated by the numerals 12 and 13 in FIG. 5. The back die 9 is shaped as a rectangle, a longer edge thereof coming into contact with the recessed edge of the die 10 thereby closing the recessed area and forming a part of the shaped opening 11.

Each block 6 and 6' of the splice bar is specially shaped to form a groove or recess in the bottom surfaces 5 and 5' and the front surfaces 6 and 6'. These grooves are illustrated by the letter A in FIG. 2. They create with the counter surfaces of the holder 2 and the die element 3, i.e. the surfaces of the holder and the die element coming into contact with the bottom and front surfaces of the blocks when the splice bar, the holder and the die element are assembled together, for each side of the splice bar a lateral or auxiliary passage. This lateral passage is curved and guides an auxiliary stream of rubber derived from the rubber stream normally guided by the upper surface of the guiding section of the splice bar downward to a lower section of the holder 2.

When reaching the lower section of the holder 2, the auxiliary stream of rubber is forced through the recesses 8 and 8' formed at each end of a lip 7 as better illustrated in FIG. 3. The front surfaces 6 and 6' on each side of the lateral passages A come into contact with corresponding surfaces of the die element 3 as is better illustrated in FIGS. 3 and 4. Indeed, the die element 3 is designed such that the thickness of the back die 9 corresponds to the thickness of the die 10 whereas a series of undercut regions 12, 13 are formed in the die for defining a passage for the auxiliary stream of rubber from the recesses 8 and 8' to the center area and the edge of the recess 11 defining the shaped opening of the die. This stream of rubber is illustrated by the arrows B in FIG. 2.

The holder 2 comprises an elongated lip 7 arranged horizontally at the cap side of its general opening receiving the splice bar. This lip 7 is integrally formed with the holder 2 and presents a front side, i.e. a side in front of the splice bar, with a general plane corresponding to the general plane of the top surfaces of the blocks 4 and 4' of the splice bar when this latter is assembled in the holder. The edge of the lip is parallel to the longitudinal axis of the splice bar and of the holder and the die element and comes into contact with the die 10 at a slight distance from the top edge of the recess 11. This is better illustrated in FIG. 4 where the inclined lip, the die and its shaped opening are visible in transparency and are represented by the dashed lines. The back side of the lip 7 defines a horizontal passage for the auxiliary stream of rubber which is illustrated by the arrows B in FIG. 2. When the splice bar and the die element are assembled in the holder, the lip 7 is in contact with the die 3 whereas the undercut areas 12 define a slot for the passage of the auxiliary streams of rubber coming from both ends of the lip and colliding at the center of the horizontal passage defined by the back side of the lip 7 and the die 10. The rubber is then forced upwardly through this slot and joins the main stream of rubber coming from the splice bar and extruded through the shaped opening 11. It then migrates together with the main stream through the opening 11 and is then co-extruded.

The functions of the above described assembly for an extruder and the extrusion process it achieves are explained more in details here below:

The assembly comprising the described splice bar 1, holder 2 and die 3 is designed to be mounted on a dual extruder, i.e. an extruder able to generate two independent streams of rubber compound, typically a two screw extruder. An extruder with more than two screws would also be suitable for the described assembly but this would not take the advantage of the fact that the described assembly and method allow the extrusion of a tire component with a coating on both its upper and lower surfaces while using only two distinct streams of rubber, i.e. as produced by a dual screw extruder.

Figure 4:
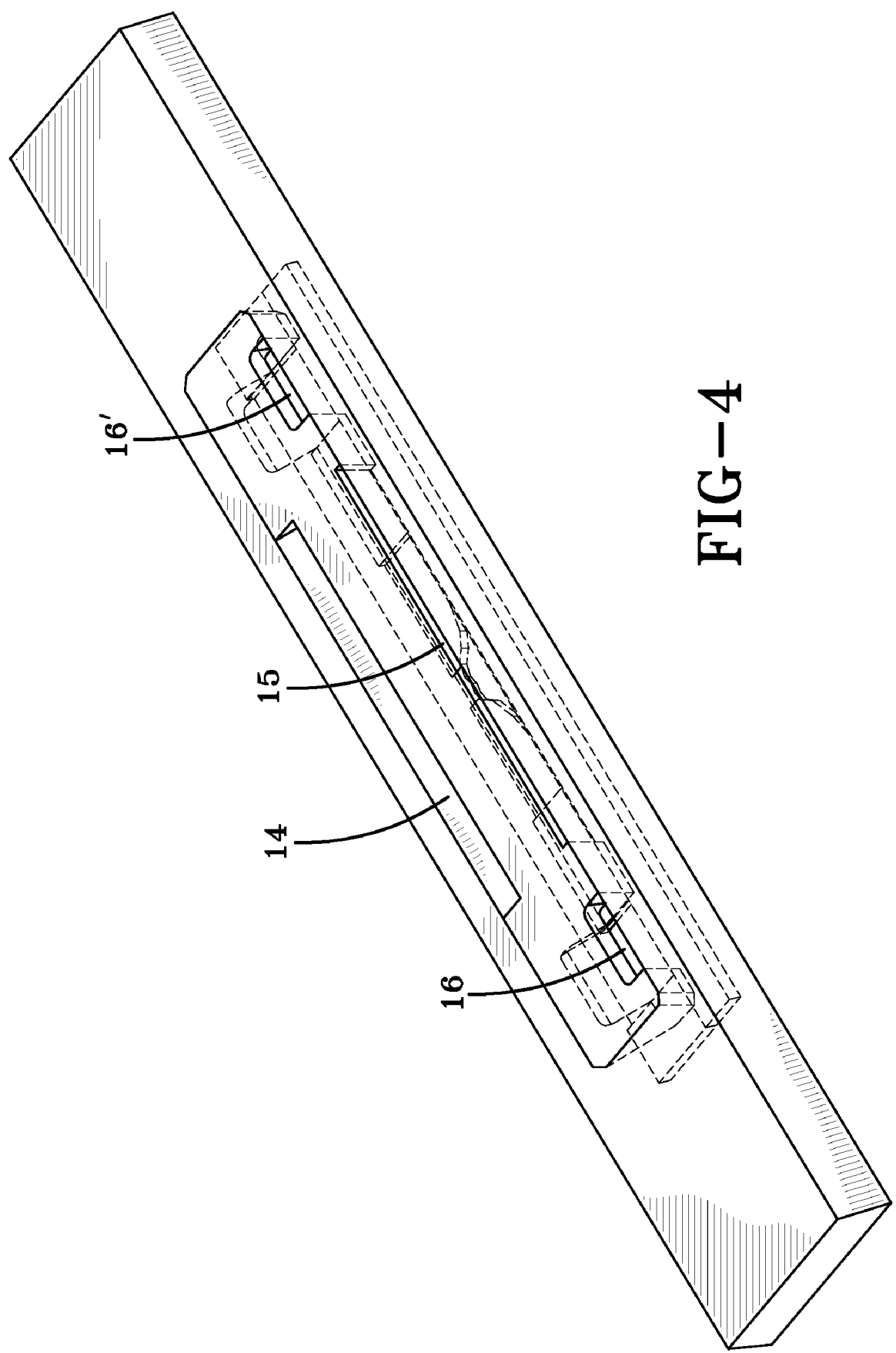
FIG. 4 is a perspective view of the assembly of FIGS. 1 and 2 in an assembled state.

A first stream of a first rubber compound is generated by the extruder and is fed to the base side of the splice bar whereas a second stream of a second rubber compound is fed to the cap side of the splice bar. The first stream is guided by the base surface C of the splice bar and the corresponding surface of the holder. Similarly the second stream is guided by the cap surface D of the splice bar and the corresponding surface of the holder. When exiting the splice bar, both streams are united to a main stream composed of two adhered layers. The inlets of the assembly for the two streams of rubber compound as well as the two auxiliary passages defined by the splice bar and the holder are well illustrated in FIG. 4 with the numerals 14, 15, 16 and 16'. Both inlets 14 and 15 have a rectangular cross section whereas the lower inlet 15 for the second stream is much thinner than the upper inlet 14 for the first stream. As illustrated in FIG. 4, the intersection line of the cap and base surfaces of the splice bar is approximately at the level of the edge of the back die 9 which defines the shaped opening 11. This intersection is in fact slightly lower than this edge of the back die 9 in order to extrude a thin layer of the second rubber compound on the upper surface of the tire element.

In parallel to the extrusion of the main stream composed of the two adhered layers of rubber compounds, an auxiliary stream of the second rubber compound is guided through the passages indicated by the arrows A and B in FIG. 2. The two inlets 16 and 16' of the lateral passages A are illustrated in FIG. 4 and are positioned approximately at the level of the inlet 15 of the lower passage in order to be fed by the extruder with the second rubber compound. After entry in the assembly, the second rubber compound streams then through the passages A to the recesses 8 and 8' of the holder 1 and then along the horizontal passage between the back side of the lip 7 and the die along the arrows B. The two horizontal streams meet at a center region of the horizontal passage and are forced through the slot defined by the back side of the lip 7 and the undercut regions 12 of the die 10, thereby joining and feeding the main stream composed of a lower thin layer of the second rubber compound and an upper thicker layer of the first compound for the body of the tire element. The auxiliary stream of the second rubber compound migrates to the upper layer of the main stream which is then extruded through the opening 11. This results in a coating of the lower side of the tire element with the same compound as on the lower or bottom side while requiring only a dual extruder. The thickness of the upper or topcoating of compound depends on many factors like, for example, the viscosity of the compounds (i.e. the type of compound and the working temperature), the shape of the tire component to be extruded, . . . . For a defined shape and determined compounds and working temperature, this depends essentially on the extrusion speed and the shape and cross section of the slot defined by the back side of the lip 7 and the undercut regions 12 of the die 10.

Figure 7:
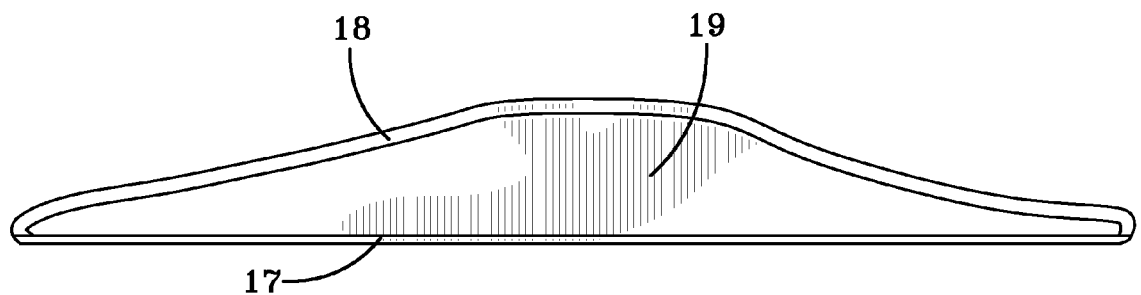
FIG. 7 is a photograph of a cross-section of a shoulder wedge produced by a method in accordance with the invention.

FIG. 7 illustrates a shoulder wedge produced by the above described assembly. As it can be seen from FIGS. 5 and 7, the shape of the shoulder wedge corresponds to the shaped opening 11 of the die element 3 of the extruder described here above. The body 19 of the shoulder wedge is made of the first rubber compound fed through the inlet 14 (FIG. 4) of the extruder assembly and guided by the cap surface D of the splice bar 1. The first rubber compound is typically an OTR carcass compound. The body 19 is covered or coated with a thin layer of the second rubber compound at this periphery, i.e. a thin layer 17 at its lower or bottom flat side and a second layer 18 at its upper or top curved side. The second compound is formulated to provide a smear of high tack compound around the shoulder wedge for facilitation the assembly with other tire components, typically a OTR smear compound. The lower layer 17 originates from the second stream fed through the inlet 15 and guided by the base surface C of the splice bar 1. The upper layer 18 is fed by the auxiliary or lateral passages and originates also from the second stream fed through the auxiliary inlets 16 and 16' (FIG. 4) and guided by grooves of the splice bar 1 and by the lip 7 of the holder 2 (FIG. 3).

In an alternative mode of carrying out the invention, a single lateral passage for an auxiliary stream of rubber can be used.

The assembly elements, i.e. the splice bar, the holder and the die are typically made of steel and formed by machining but alternative ways known those skilled in the art for shaping these elements as described here above can also be considered.

The invention has been described with reference to a best mode. Obviously, modification and alternations will occur to others upon a reading and understanding of this specification. It is intended to include all such modifications and alternations in so far as they come within the scope of the appended claims or the equivalents thereof.

What is claimed is:

1. An assembly for a tire component extruder, comprising:
a splice bar designed for guiding and uniting a first stream of a first rubber compound and a second stream of a second rubber compound, the splice bar being an elongated element with a fastening and positioning block at each end, the cross section of the blocks is trapezoid, each block has a bottom surface, a front surface, a top surface and a rear surface, the cross section of a guiding section of the bar is triangular having base surface C designed to guide a first stream of rubber and cap surface D designed to guide a second stream of rubber, the rear surface of the guiding section is in the same plane as the rear surface of the blocks, this surface is designed to come in contact with a corresponding surface of an extruder able to produce two distinct streams of rubbeR, the cap and base surfaces of the guiding section of the splice bar intersect downstream in order to bring together and unite the two separate streams of rubber;
a die to be positioned downstream of the splice bar, the die comprising a shaped opening through which the united streams of the first and second compounds are extruded for forming the tire component;

an auxiliary channel in communication with the second stream of the second rubber compound and with a feeding end between the splice bar and the die at the vicinity of the united first and second streams of rubber compounds at the first stream side in order to feed the united streams at a side opposite to the second stream with an auxiliary stream of the second compound before extrusion through the die;

a holder shaped as a rectangular plate with an opening, the opening being shaped for receiving the splice bar, the bottom surfaces and top surfaces of the blocks come in thrust engagement with corresponding surfaces of the opening; and wherein the die element is generally shaped as a plate comprising a shaped opening through which the tire component is extruded, the holder and the die element being designed to come into engagement when assembled, when the splice bar, the holder and the die element, are assembled together, the front surfaces of each block of the splice bar are in contact with a rear surface of the die.

2. An assembly according to claim 1, wherein the channel is in communication with the second stream of the second rubber compound upstream of the splice bar.

3. An assembly according to claim 2, wherein the channel comprises at least a lateral passage provided in the splice bar in communication with the second stream.

4. An assembly according to claim 1, wherein the feeding end of the channel comprises a slot.

5. An assembly according to claim 4 further comprising:
a lip designed to be positioned between the splice bar and the die and inclined towards the die such that the lip guides the united streams at the first stream side towards the die, the slot being arranged downstream of the lip.

6. An assembly according to claim 5, wherein the holder has the opening designed for receiving the splice bar on one side and the die on the other side, and wherein the lip is provided on the holder in the opening.

7. An assembly according to claim 6, wherein the downstream side of the lip and the die form a passage of the auxiliary channel.

8. An assembly according to claim 7, wherein the die comprises a plate with a shaped opening corresponding to the cross-section of the tire component to be extruded, the edge of the lip being distant from the plate in the area of said shaped opening in order to firm the slot for feeding the auxiliary stream of the second rubber compound.

9. An assembly according to claim 8, wherein the splice bar has at each extremity the positioning block with at least two surfaces coming into contact with the holder when the splice bar is positioned in the holder, wherein each of the blocks comprises a lateral passage A formed in the at least two surfaces, the lateral passage A forming with the holder a curved passage of the auxiliary channel guiding the second rubber compound from the second stream upstream of the splice bar to the horizontal passage between the lip and the die.

10. An assembly according to claim 9, wherein the curved passage communicates with the passage between the lip and the die at a lateral end of the lip for feeding the horizontal passage between the lip and the die with the auxiliary stream of second rubber compound.

11. An assembly according to claim 10, wherein the opening of the holder comprises a recess at a lateral end of the lip for communicating the curved passage with the horizontal passage between the lip and the die.

12. An assembly according to claim 11, wherein the die plate is slightly recessed at an area in the vicinity of the shaped opening on the side of the plate coming into contact with the holder, the recessed area forming the slot between the die and the lip for the auxiliary stream of the second rubber compound, wherein the two inlets of the lateral passages A are positioned to be fed by the extruder with the second rubber compound, after two flows of the second rubber compound streams pass through the lateral passages A to the recesses of the holder and then flow along the horizontal passage between the back side of the lip and the die, the two horizontal flowing streams collide meeting at a center region of the horizontal passage and are forced through the slot defined by the back side of the lip and the undercut regions of the die, thereby joining and feeding the main stream composed of a lower thin layer of the second rubber compound and an upper thicker layer of the first compound for the body of the tire element.

13. An assembly according to claim 12, wherein the die comprises a first plate with a first recessed edge and a second plate with a second edge to be positioned against the first edge, the first recessed edge and the second edge forming the shaped opening of the die.

14. The assembly of claim 13 wherein the second plate is shaped as a rectangle, a longer edge thereof coming into contact with the recessed edge of the first plate thereby closing the recessed area and forming a part of the shaped opening and intersection line of the cap surface D and base surfaces of the splice bar is approximately at the level of an edge of the second plate which defines the shaped opening, this intersection is set slightly lower than this edge of the second plate to extrude a thin layer of the second rubber compound on the upper surface of the tire component being extruded.

* * * * *